Patented Feb. 17, 1942

2,273,253

UNITED STATES PATENT OFFICE 2,273,253

BEET SUGAR MANUFACTURE

Robert M. Daniels, Colorado Springs, Colo., assignor to Holly Sugar Corporation, Colorado Springs, Colo., a corporation of New York No Drawing. Application July 31, 1940, Serial No. 348,740

5 Claims. (Cl. 127—50)

This invention relates to beet sugar manufacture, and more particularly to the treatment of the raw beet juice by a calcium compound and carbon dioxide for clarifying the juice.

It has been the practice for many years to produce lime and carbon dioxide for beet juice clarification by calcining calcium carbonate, in the form of lime-rock, in vertical kilns. The lime-rock is mixed with coke and calcined, and the burned lime (CaO) resulting therefrom is treated to produce a product suitable for assisting in the clarification of the beet juice. In so-called "straight house" operations, the CaO is mixed with wash water from the filter presses, called sweet water, to form milk of lime (Ca(OH)$_2$), and is then mixed with beet juice, resulting in the chemical neutralization of the acids in the juice plus a coagulation and precipitation of the organic and inorganic material present in the juice in a fine state of subdivision. This mixture of juice and lime then has passed through it carbon dioxide ($CO_2$) resulting from the calcining of the lime with the coke, which results in a precipitation of calcium carbonate in which precipitation there are occluded various substances previously precipitated or adsorbed from the juice previously described. The solid material is then filtered away from the juice after this precipitation, and the clear juice results. Said solid precipitated material which is filtered from the juice is known as lime-cake or lime-mud.

In another type of operation, known as "Steffens house," limestone and coke are calcined as heretofore described, but the CaO resulting therefrom is powdered and added to molasses under certain conditions of temperature and dilution. The resulting product from this mixing of lime and molasses is a chemical known as calcium saccharate, a combination of sugar existing in the molasses, and of lime. This calcium saccharate is then used for the same purpose as calcium hydrate is used in the straight house operation, a resulting product, calcium carbonate, in the form of cake or mud, being formed as described above, and removed from the juice by filtration.

Enormous quantities of lime mud or cake have accumulated in beet sugar operations for the reason that, prior to the process disclosed in my Patent No. 2,194,164, dated March 19, 1940, it was not known how to treat the lime mud to produce CaO, together with $CO_2$ in sufficient concentrations, for use in clarifying beet juice. Many thousands of tons of lime cake have resulted from past operations and were regarded simply as waste material, aside from some trifling use as fertilizer.

Vertical kilns are unsuitable for the calcining or roasting of lime cake since such kilns require a substantial upward draft, and only larger sizes of lime rock can be successfully burned therein. In the past, attempts were made to calcine lime cake in direct-fired furnaces, but the $CO_2$ obtained was so diluted with combustion gases that its concentration was below that deemed essential for proper carbonation of the beet juice.

In my patent above-specified, I have disclosed a process wherein lime cake is calcined in an indirect-fired furnace, and the $CO_2$ resulting from the indirect firing, while of concentration far above that desired for carbonating the juice, is diluted with other gases to produce an appropriate concentration. This process has proven distinctly successful and is in use by the assignee of said patent.

In operating in accordance with the process of said patent, the lime derived from calcining the lime-cake is treated in the same way as the lime obtained by the calcination of lime-rock, to produce calcium hydrate or calcium saccharate, as above described, and said calcium hydrate or saccharate is introduced into the beet juice together with carbon dioxide of suitable concentration. I have now discovered, however, that the concentration of carbon dioxide required for carbonating beet juice to which a calcium compound derived from lime-cake has been added is substantially lower than that previously deemed necessary for proper beet juice carbonation, and in fact is sufficiently low to permit calcination of the lime-cake by direct-firing alone. Indeed, I have found that when the calcium compound added to the beet juice is obtained from lime derived substantially entirely from lime-cake, carbon dioxide concentrations of from about 15% to 20% are adequate for proper carbonation of the juice. Such low $CO_2$ concentrations have previously been regarded as not even worth considering. Indeed, the art has previously deemed a $CO_2$ concentration of 30% as the lower limit for successful carbonation, and higher concentrations have been definitely preferred. In direct-fired operations, about 26% $CO_2$ concentration has been the highest obtained, so far as I am aware, but even this concentration is substantially higher than those usually attained in previous endeavors to roast or calcine lime-cake in direct-fired furnaces.

My discovery that lime derived from lime-cake enables the employment of markedly lower $CO_2$ concentrations permits the lime-cake to be calcined or roasted by direct firing, which previously had been regarded as futile for beet sugar operations. As above noted, when the calcium compound added to the juice is obtained from lime derived entirely from lime cake, a $CO_2$ concentration of from about 15% to about 20% is sufficient for satisfactory carbonation of the beet juice.

I have found further that the calcium compound utilized in treating the beet juice need not be obtained substantially entirely from lime derived from lime cake in order to permit low $CO_2$ concentrations such as are obtainable by direct firing operations; but that the lime which is treated to produce said calcium compound may comprise a substantial proportion of lime from other sources such as the lime customarily obtained from the calcining of lime rock in vertical kiln operations. From my experience and observations in the clarification of beet juice with calcium compounds obtained by treatment of lime from lime-cake, and mixtures of lime-cake lime with lime from lime rock, I can state that a mixture of about 75% lime from lime-cake and about 25% lime from lime rock may be treated in the customary manner to produce a calcium compound, such, for example, as calcium saccharate or calcium hydrate, which requires a $CO_2$ concentration of about 20% to about 25% for the clarification of beet juice.

When the lime employed for the calcium compound for treating the beet juice consists of about 50% lime from lime-cake and 50% lime from lime-rock, the $CO_2$ concentration may be from about 25% to about 28% for satisfactory clarification of the juice. If the lime-cake lime forms about 25% of the lime employed, the remainder being lime obtained from lime-rock, a suitable $CO_2$ concentration is from about 28% to about 30%.

As hereinbefore noted, when the lime consists entirely of lime from lime-rock, without any lime from lime-cake, the minimum $CO_2$ concentration is 30%, and substantially higher $CO_2$ concentrations are preferably employed.

The percentages of lime-cake lime and lime-rock lime hereinbefore specified are by weight; the $CO_2$ concentrations on the other hand being, of course, expressed in terms of percentage by volume of the $CO_2$ in the gases applied to the carbonation of the juice.

I do not profess positive or complete knowledge of the reasons why the startlingly low $CO_2$ concentrations above mentioned may be employed for clarification of the beet juice when lime derived from lime-cake is utilized to form the calcium hydroxide or saccharate employed. Such may be due, to some extent, to the extremely finely divided condition of said lime, even though the lime undergoes a change in its chemical state prior to application of the $CO_2$ gas. It may be observed in passing, that lime produced by calcining lime-cake, after being cooled and pulverized in conventional equipment, is found to have a specific surface of from about 3600 to about 4200 (i. e., square centimeters per gram). On the other hand, lime obtained by calcining lime-rock and pulverized to approximately 200 mesh, as is customary, has a specific surface of from about 1600 to 2200. The lime derived by calcining lime-cake, furthermore, does not require the heavy pulverizing mechanism or ponderous grinding rolls employed for the pulverizing of lime from lime-rock, and may be readily pulverized in the ordinary hammer mill, before being treated to produce calcium hydrate or calcium saccharate.

The fineness of the lime obtained from lime-cake may be accounted for by the fact that the calcium carbonate of the lime-cake, being a re-precipitated material, is itself in a state of extremely minute subdivision. Furthermore, in the calcining of the lime-cake the lime, or CaO, is burned to substantially the same degree of hardness in its entirety. The pieces of lime-rock employed in vertical kilns, however, must be of quite substantial size, and pieces of less diameter than approximately two inches, commonly termed "spalls," are screened out as likely to seal up the charge in the kiln and block the draft therethru. As a result, in the calcining of lime-rock, the lime is not at all burned to the same degree of hardness. Some of the lime is substantially over-burned, while other portions are burned incompletely, so that the hardness varies widely. Consequently, various time limits are required both in slaking and carbonating.

Indeed, it is not unusual that lime from lime-rock varies in slaking time from almost instantaneous to several hours, resulting in entirely different reactions in the carbonation tanks when used in Steffen house operations. The end point of carbonation, or the point where flocculation and coagulation of materials occur, is indistinct, and in some instances a prolonged process. In contrast, the end point is sharp and distinct when finely-divided uniformly-burned lime from lime-cake is utilized to produce the calcium hydroxide or calcium saccharate employed for defecating the juice.

As hereinbefore pointed out, I have found that when lime from lime-cake is to be employed in beet juice clarification, the lime-cake may be calcined in a direct-fired furnace, and the $CO_2$ concentrations obtained therefrom applied satisfactorily to the carbonating of the beet juice, particularly where the lime-cake lime forms a sufficient proportion of the lime utilized for clarification. The furnace employed may, for example, be of the multiple hearth type, such as shown in my Patent No. 2,194,164, but with the muffle hearths omitted and replaced by direct-fired hearths. Or a rotary direct-fired kiln of the type employed for the manufacture of Portland cement may be utilized. Any other suitable direct-fired furnace may be employed. Oil, gas or other desired fuel may be used. The lime-cake may, of course, be heated to dry the same to any desired extent, prior to calcining.

When the lime employed for clarification of the beet juice contains a proportion of lime-cake lime insufficient to enable the use of $CO_2$ concentrations obtained from a direct-fired furnace for carbonating the beet juice, the gases from the vertical kiln in which the lime-rock lime is produced may be mixed with the gases from the direct-fired furnace to raise the $CO_2$ concentration to the appropriate value. In the production of lime from lime-rock in vertical kilns, using coke as a fuel, a $CO_2$ concentration of about 33–36% usually results. On the other hand, the maximum $CO_2$ concentration of which I am aware which is obtainable in a direct-fired furnace is around 26%, using oil as fuel; the $CO_2$ concentrations in direct-fired furnaces being still lower when the fuel is gas. If, for example, the lime employed contains only 25% (by weight) of lime from lime-cake, the $CO_2$ from the direct-fired furnace may be brought up to the appropriate concentration (about 28-30%) by mixing the gases from said furnace with those from the vertical kiln or kilns in which the lime from lime-rock is obtained. It may be noted that the use of even small percentages of lime-cake lime along with lime from lime-rock enables less lime-rock to be purchased and results in increased economy. The ability to employ direct-fired furnaces for calcining lime-cake also enables the expense of indirect-fired hearths to be avoided. And, even where the proportion of lime-rock lime to lime-cake lime in the lime employed for clarification of the juice is in the neighborhood of 3 to 1 or more, requiring a greater $CO_2$ concentration for carbonation of the juice than is obtained in direct-fired furnaces, said concentration may be increased to the desired amount by mixing the gases from the direct-fired furnace or furnaces with those from the vertical kiln or kilns in which the lime-rock is calcined. Mixing of said gases from said furnaces and kilns may, of course, be effected for proportions of lime-cake lime greater than 25% and is generally advantageous where the percentage of lime-cake lime employed is no more than about 50% by weight of the amount of lime utilized in the clarification process. Even for percentages of lime-cake lime somewhat greater than 50%, such mixing may be advantageous, and especially where a fuel other than oil is employed for firing the direct-fired furnace.

The term "slaking" as used in the appended claims is not restricted to the treatment of lime to form calcium hydroxide; but includes the production of equivalent calcium compounds suitable for defecating beet juice, such, for example, as calcium saccharates.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. The process of treating sugar beet juice comprising slaking calcium oxide to produce a calcium compound suitable for defecating said beet juice, from about 25% to about 100% by weight of said calcium oxide being derived from the calcining of lime cake, introducing said calcium compound into said juice, and carbonating said juice by introducing therein gases having a carbon dioxide concentration less than 30%.

2. The process of treating sugar beet juice comprising calcining lime-cake in a direct-fired furnace to produce calcium oxide together with gases containing carbon dioxide in concentration less than 30%, slaking said calcium oxide to produce a compound suitable for defecating said beet juice, introducing said compound into said beet juice, and carbonating said beet juice by introducing said gases into said beet juice.

3. The process of treating beet juice comprising calcining lime-rock in a vertical kiln to produce calcium oxide and gases containing carbon dioxide, calcining lime cake in a direct-fired furnace to produce calcium oxide and gases containing carbon dioxide, slaking the calcium oxide derived from said lime rock and also the calcium oxide derived from said lime cake to produce a calcium compound suitable for defecating the beet juice, introducing said calcium compound into said beet juice, and carbonating said beet juice by introducing gases from both said vertical kiln and said direct-fired furnace into said beet juice.

4. The process of treating sugar beet juice comprising calcining lime-rock to produce calcium oxide and gases containing carbon dioxide, calcining lime-cake in a direct-fired furnace to produce calcium oxide and gases having a carbon dioxide concentration less than 30%, slaking the calcium oxide derived from the calcination of both said lime-rock and said lime-cake to produce a compound suitable for defecating said juice, introducing said compound into said juice, mixing the gases from the calcination of both said lime-rock and said lime-cake, and introducing said mixture of gases into said juice for carbonating the same.

5. The process of treating sugar beet juice, comprising calcining lime-cake in a direct-fired furnace to produce calcium oxide together with gases having a carbon-dioxide concentration less than 30%, slaking said calcium oxide to produce a calcium compound suitable for defecating beet juice, introducing into the beet juice a quantity of calcium compound suitable for defecating the same, at least one-fourth by weight of said calcium compound being derived from the aforesaid slaking of said calcium oxide, and introducing into said juice gases having a carbon dioxide concentration less than 30% for carbonating said juice.

ROBERT M. DANIELS.